H. W. FELLOWS.
VARIABLE SPEED GEARING.
APPLICATION FILED JUNE 23, 1910.
1,015,617.
Patented Jan. 23, 1912.
3 SHEETS—SHEET 1.
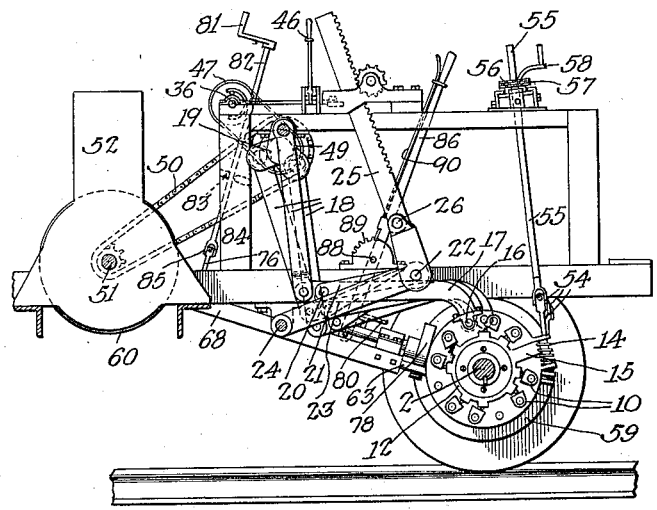
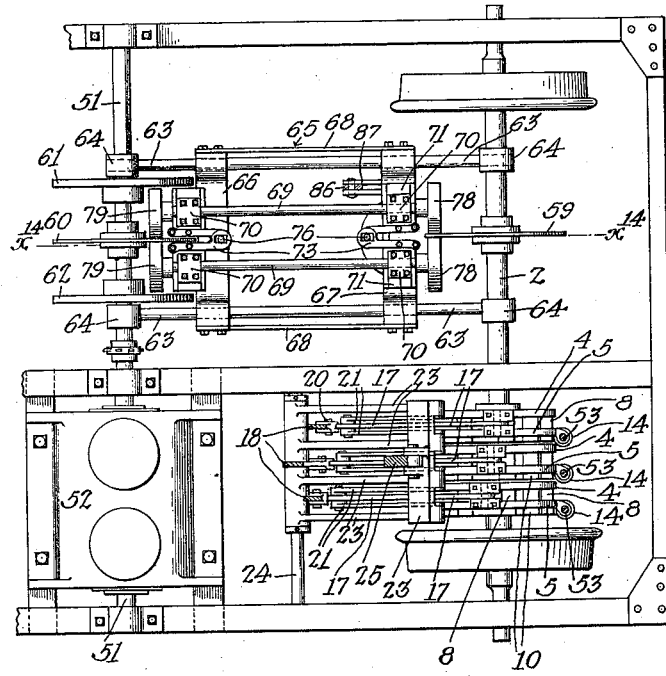
Witnesses:
Inventor:
Hugh William Fellows.

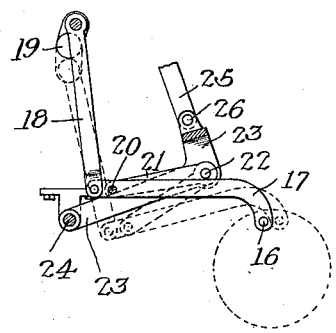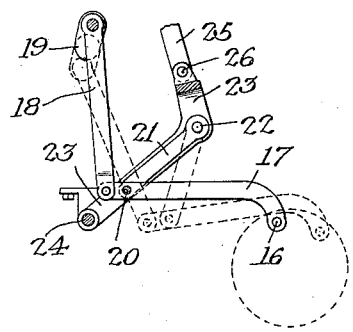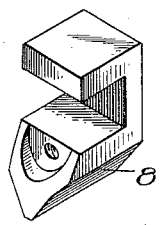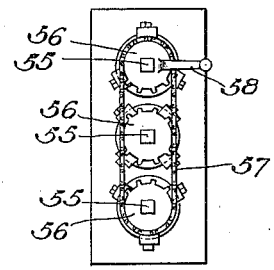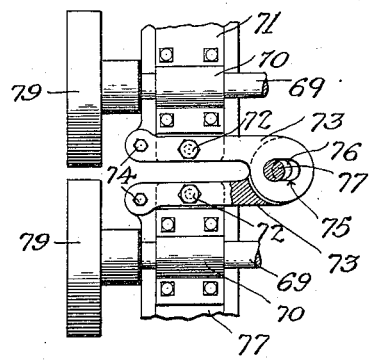

H. W. FELLOWS.
VARIABLE SPEED GEARING.
APPLICATION FILED JUNE 23, 1910.
1,015,617.
Patented Jan. 23, 1912.
3 SHEETS—SHEET 3.
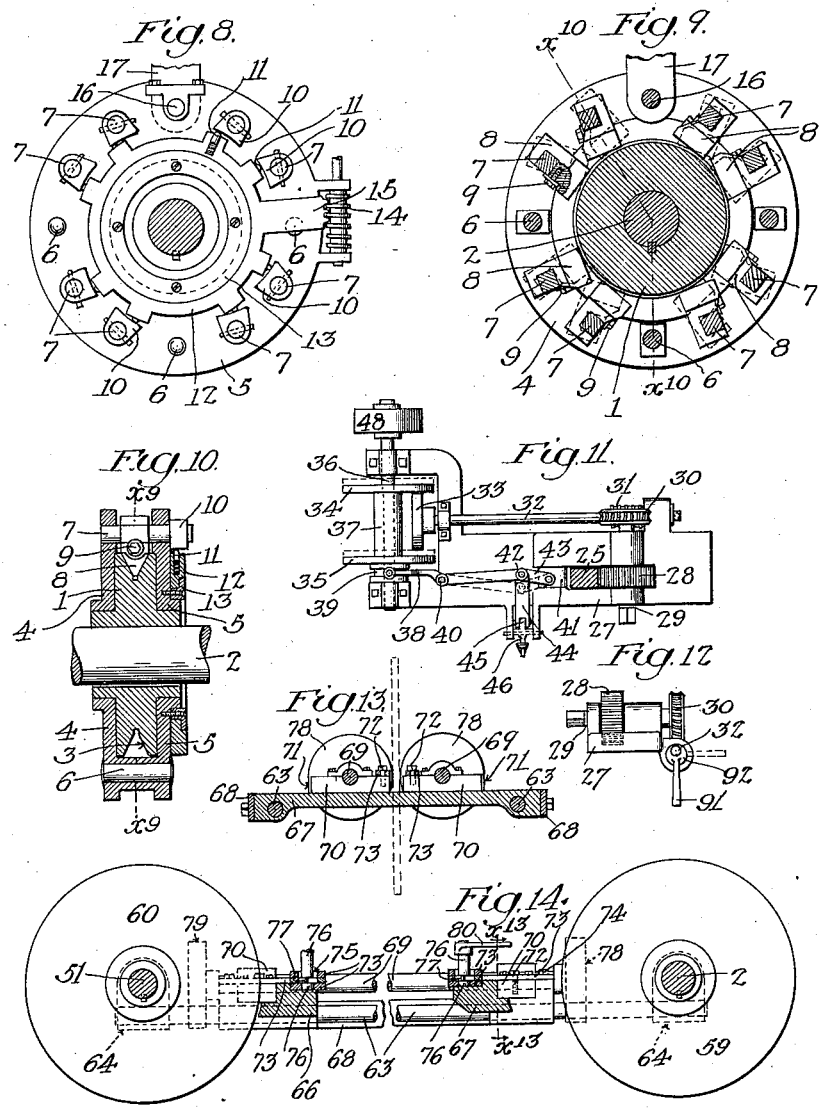

UNITED STATES PATENT OFFICE.

HUGH WILLIAM FELLOWS, OF LOS ANGELES, CALIFORNIA, ASSIGNOR TO FELLOWS DIRECT POWER TRANSMISSION COMPANY, OF LOS ANGELES, CALIFORNIA, A CORPORATION OF ARIZONA TERRITORY.

VARIABLE-SPEED GEARING.

1,015,617.      Specification of Letters Patent.      Patented Jan. 23, 1912.

Application filed June 23, 1910. Serial No. 568,549.

*To all whom it may concern:*

Be it known that I, HUGH WILLIAM FELLOWS, a citizen of the United States, residing at Los Angeles, in the county of Los Angeles and State of California, have invented new and useful Improvements in Variable-Speed Gearing, of which the following is a specification.

This invention relates to variable speed gearing and to that class of mechanism wherein changes in the speed are secured by varying the degree of stroke of an oscillatory driver which actuates the driven shaft.

The invention also includes means for driving the driven shaft at a higher speed than by the oscillatory driver, the latter being utilized in starting, or in carrying a heavy load at comparatively low speed, the former being utilized in operating at high speeds, or after the load has been started and is under headway or when the load is sufficiently light.

One object of the invention is to improve the gripping and wearing qualities of the oscillatory driver, and to provide means whereby it may be regulated to drive the driven shaft in either direction.

Another object is to provide an improved mechanism for operating and regulating the stroke of the oscillatory driver whereby the regulating mechanism may be adjusted through a wide range from zero or point of non-oscillation to a maximum degree of oscillation, giving the highest speed, of which the oscillatory driver is capable.

Another object is to provide means for adjusting the regulating means by power.

Another object is to provide an improved means for frictionally driving the driven shaft in lieu of the oscillatory driver, such friction driving device being capable of adjustment to secure a great range in speed and corresponding power.

Referring to the drawings: Figure 1 is a side elevation of the invention. Fig. 2 is a plan view. Fig. 3 is a side elevation of one unit of the oscillatory regulating and driving linkage, showing it adjusted for producing a relatively short oscillation of the oscillatory driver. Fig. 4 is a view similar to Fig. 3 showing it adjusted for securing a relatively long stroke of the oscillatory driver. Fig. 5 is a perspective of one of the gripping wedges. Fig. 6 is a plan view of the chain connections for simultaneously regulating the three units of the oscillatory driver. Fig. 7 is a plan view of the friction disk adjusting devices. Fig. 8 is a side elevation of an oscillatory driver. Fig. 9 is a section on line $x^9$—$x^9$ Fig. 10. Fig. 10 is a section on line $x^{10}$—$x^{10}$ Fig. 9. Fig. 11 is a plan view of the power operating means for adjusting the stroke of the linkage. Fig. 12 is an end elevation of the worm and pinion shown in Fig. 11. Fig. 13 is a section on line $x^{13}$—$x^{13}$ Fig. 14. Fig. 14 is a section enlarged on line $x^{14}$—$x^{14}$ Fig. 2.

The oscillatory driver consists of three units, each unit comprising, as shown in Figs. 8, 9 and 10, a disk 1 fixed on the driven shaft 2, the disk having a V-shaped groove 3 in its periphery. The disk 1 is shouldered on each side and loosely mounted thereon are two rock plates 4 and 5 which are secured together by rivets 6. A series of shafts 7 extends through the two rock plates 4 and 5 and the center portion of each shaft 7 is square, as shown in Fig. 9. Adjustably secured on the squared portion of each shaft 7 is a gripping wedge 8, shown in detail in Fig. 5, the wedge shaped portion of which lies within the groove 3 of the disk 1, the gripping wedge being detachably secured to the shaft 7 by a bolt 9, the head of which projects over the edge of the shaft 7, so that by removing the bolt 9 of any gripping wedge, the latter may be slipped out and replaced quickly without taking apart any of the other elements. On one end of each shaft 7 is secured a tilt block 10, pressing against the inner face of which is a spring pressed stud 11 slidable radially in a shift ring 12, which is revolubly secured to the rock plate 5 by a flanged ring 13. When the shift ring 12 lies in the position shown in Fig. 8, each stud 11 stands at one side of the adjacent shaft 7 and presses against the tilt block 10 and holds the associated wedge block 8 tilted so that one edge thereof is nearly radial, as shown in Fig. 9, and that side of the wedge block is in contact with the groove 3. When the shift ring 12 is moved to mid position each stud 11 stands directly in line with the adjacent shaft 7 and holds the tilt block 10 in central position, so that the associated gripping wedge is held in central position and its wedge portion is out of contact with the groove 3. When the shift ring is in the opposite position from that shown in Fig. 8, the tilt blocks 10 will be tilted in the opposite direction and the wedge blocks 8 will all contact at their opposite sides with the groove 3, as indicated in dotted lines in Fig. 9. The shift ring 12 is adjusted to either of these three positions by a worm 14 which meshes with a toothed arm 15.

The wedge block is shorter between its shaft and the groove than the space between the shaft and groove so that when in central position the wedge does not contact with the groove. When the wedge is tilted either way it cannot be moved beyond such tilted position because the distance between the center of the shaft 7 and either corner of the wedge is greater than the distance between the center of the shaft 7 and the nearest point of the groove. Such difference, however, is slight and is what causes the wedge to be drawn into more intimate engagement with the groove by the friction thereof than it would be by the mere pressure produced by the spring pressed pins 11.

As the rock plates 5 are oscillated they move the gripping wedges back and forth in the groove 3 and the wedges grip the groove during the movement in one direction, thereby driving the disk 1 in that direction, while during the return oscillation the gripping wedges do not grip the groove but swing free and do not retard or reverse the direction of the disk 1. Obviously, the direction of rotation imparted to disk 1 will depend upon the position into which the tilt blocks 10 are shifted. When the tilt blocks 10 are held in mid position, the gripping edges are out of contact with the groove 3 and although the rock plates continue to oscillate, no movement will be imparted to the disk 1. Owing to the wedging action of the gripping wedges in groove 3, they are forced therein very tightly during the driving stroke and thus positively drive the disk. During the recovery stroke when driving forward or driving reversely, there is no tendency for the gripping wedges to be forced into wedging contact in the groove 3.

In order to secure a practically uniform movement of the shaft 2, three oscillatory drivers above described are employed as shown in Figs. 1 and 2. Each oscillatory driver has a pin 16 to which is connected a link 17 which is connected at its other end to the lower end of a connecting rod 18 which is operated from a crank shaft 19. Pivotally connected at 20 to each link 17 is a pair of intermediate links 21 which are pivoted at 22 to a rock frame 23, the latter being journaled on a shaft 24. The rock frame 23 is stationary during the operation of the linkage, being only used for regulating the stroke thereof. As the crank shaft 19 revolves it imparts a swinging motion to the end of the link 17, as shown in Fig. 3, in which full lines indicate one extreme position of the link 17 and the dotted lines indicate the other extreme position of the link 17. During this swinging motion of the link 17, its outer end is caused to move in an arc of a circle, of which the pivot 22 is the center, by means of the connecting intermediate links 21. Thus a compound movement of the link 17 is performed, the longitudinal portion of which movement produces oscillation of the oscillatory driver. The throw of the crank shaft 19 is always the same, therefore, the swing of the outer end of the link 17 is always the same, while the longitudinal movement of the link which determines the degree of oscillation of the oscillatory driver, is regulated by shifting the fulcrum 22 by rocking the rock frame 23. The farther the fulcrum 22 is moved away from a straight line between the two ends of the link 17, the greater will be the longitudinal motion imparted to the link 17. This will be apparent from an inspection of Fig. 4 wherein the rock frame is shown as adjusted for producing a relatively long stroke, full lines showing the parts in one extreme position and dotted lines showing the parts in the other extreme position.

All three sets of intermediate links 21 are pivoted to the rock frame 23, so that when the rock frame 23 is adjusted all three sets of oscillatory drivers will have their stroke adjusted in unison, so that all three will operate in harmony. The rock frame 23 is adjusted by power through the medium of a rack 25 which is pivoted at 26 to the rock frame, as shown in Figs. 1 and 11, and the rack projects up through a plate 27 and meshes with a pinion 28 mounted on a shaft 29 and having a worm gear 30 which is operated by a worm 31 on a shaft 32. The shaft 32 has fixed thereon a disk 33 and may be caused to rotate in either direction by engaging it with either of two disks 34 and 35 which rotate with a shaft 36, but are slidable thereon, being connected by a sleeve 37. The disks 34 and 35 are shifted by means of a fork lever 38 which engages a grooved collar 39, the lever 38 being pivoted at 40. Slidable in the plate 27 is a block 41 which is connected at 42 by a short link 43 with the end of the lever 38. A link 44 is also connected at 42 to the lever 38 and link 43, and at its other end connects to a short arm 45 projecting from a pivoted hand lever 46. When the hand lever 46 is adjusted to the position shown in Fig. 11 the block 41 does not bear against the rack 26 and the latter is thus free to slide to operate the pinion 28 and at such times the lever 38 holds the disk 34 in contact with disk 33, so that as the shaft 36 rotates the rack 26 will be moved in one direction to adjust the position of the rock frame 27. By moving the handle 46 to mid position the link 43 and lever 38 will be moved into alinement with each other and act as a toggle to force the block 41 against the rack 26 and move the latter into intimate contact with the pinion 28, thus holding the rack 26 from accidentally moving up or down and also from rattling. At the same time the disks 34 and 35 are both in mid position and neither of them contacts with disk 23. By moving the hand lever 46 to the opposite position from the center, the lever 38 and link 43 will be moved into position shown in dotted lines in Fig. 11, thus releasing the rack 26 and placing the disk 35 in contact with disk 38 and causing the shaft 32 to revolve in the other direction and adjust the rack 26 and rock frame 27 accordingly. The object of the pressure block 41 is to hold the rack 26 from rattling and to lock it, together with pinion 28, and connecting parts, from movement while both disks 34 and 35 are out of contact with disk 33. Thus, after the rock frame 37 has been adjusted to the desired position, it is locked in such position by the pressure block 41 holding the rack 26 against longitudinal movement in either direction.

The shaft 36 is driven by a belt 47 which runs over a pulley 48 on shaft 36 and over a pulley 49 on the crank shaft 19. The crank shaft 19 is driven by chain 50 from motor shaft 51 of motor 52. It will be noted that the shaft 36 is belt driven and therefore capable of slipping, and that the shaft 32 is frictionally driven and also capable of slipping, so that in adjusting the rock frame, if any accident should prevent its being shifted or if the operator should attempt to move it too far, either the belt 47 will slip or the disk 33 will slip without doing damage.

The worms 14 which regulate the position of the shift rings 12 to start, stop or reverse the operation of the oscillatory drivers, are synchronously adjusted, the shaft 53 of each worm 14 being connected by a universal joint 54, as shown in Fig. 1, with a square shaft 55, each square shaft 55 extending up through a sprocket 56, as shown in Fig. 6. A chain 57 connects the three sprockets 56 and one of the sprockets 56 is operated by a crank 58, so that when the latter is turned, all three sprockets revolve in unison and thus all three worms 14 are turned an equal amount.

The foregoing mechanism is utilized in starting, especially under heavy loads, or in carrying heavy loads, hill climbing, etc., but is not designed to be used for driving at high speed, the latter being accomplished by the friction driving mechanism shown in Figs. 1, 2, 6, 7, 13 and 14, and which comprises a driven disk 59 mounted on the shaft 2. A driving disk 60 is mounted on the motor shaft 51. Disks 61 and 62 are also fixed on the motor shaft 51. Guides 63 extend from shaft 51 to shaft 2 and are supported by means of sleeves 64 in which the respective shafts freely rotate. Slidable on the guides 63 is a frame 65 consisting of cross bars 66 and 67 which are tied together by bars 68. Intermediate driving shafts 69 are journaled in boxes 70, the latter being slidable laterally in ways 71. Each box 70, as shown in Fig. 7, is pivoted at 72 to arms 73 which are fulcrumed at 74 to the stationary ways 71. One arm 73 has an elongated slot 75, and a shaft 76 extends through the slot 75 and has an eccentric 77 which engages in the lower arm 73, as clearly shown in Fig. 14, so that as the shaft 76 is turned it spreads the arms 73 slightly at their joint by means of the eccentric 77, during which movement the shaft 76 also partakes of a slight lateral bodily movement, which is permitted. Each shaft 69 has a friction wheel 78 on one end and a friction wheel 79 on the other end. The friction wheels 78 may be brought to bear against opposite sides of the disk 59 by adjusting the associated shaft 76 which is provided with a handle 80 for that purpose, which is ordinarily left in position with the wheels 78 both in contact with the disk 59. The wheels 78 may be caused to contact with the opposite sides of the disks 59 or wheels 79 caused to contact with the opposite faces of the disk 60 or with the inner faces of disks 61 and 62 by adjusting the associated shaft to tilt the arms 73 and slide the boxes 70. When the wheels 79 are in contact with the disk 60, the shaft 2 is caused to revolve forwardly, with the motor shaft 51 turning clockwise; while, when the wheels 79 are in contact with the disks 61 and 62, the shaft 2 is driven reversely; while when the wheels 79 are in mid position and out of contact with disks 60, 61 and 62, no power is transmitted to the shaft 2.

The forward shaft 76 is controlled by a crank 81 from a shaft 82, the latter loosely passing through a support 83 on one of the frame standards 84, as shown in Fig. 1, the lower end of the shaft 82 being connected by universal joint 85 with forward shaft 76.

The frame 65 may be moved in either direction along the guides 63 to adjust the wheels 78 and 79 toward or from the centers of shafts 2 and 51 to vary the ratio of speed between the respective shafts, and during such sliding movement of the frame 65, the lower end of the shaft 82 is carried bodily with it, the joint 85 and the loose support 83 permitting such operation without binding the shaft 82. When the frame 65 is in position shown in Fig. 2, the slowest speed will be imparted to the shaft 2, the wheels 79 at that time being nearest the center of the disk 60 and the wheels 78 being farthest from the center of disk 59. When the frame 65 is in the extreme opposite position, the shaft 2 will be driven at the highest speed, while all intermediate speeds are secured by correspondingly adjusting the frame 65 to intermediate positions between the two extremes. The frame 65 is adjusted along the guides 63 by means of a hand lever 86, the lower end of which is connected to a bracket 87, as shown in Fig. 2, and which is pivoted at 88 to a notched sector 89, as shown in Fig. 1. The hand lever 86 may be locked in any position on the sector by a latch mechanism 90.

If at any time it is desired to adjust the stroke of the oscillatory drivers manually without employing the power means, it may be done by shifting handle 91 into position shown in dotted lines in Fig. 12, which will turn an eccentric 92, in which the end of the shaft 32 is mounted, so that as the eccentric 92 is turned, that end of the shaft 32 is lowered and the worm 31 is moved out of mesh with worm gear 30, whereupon the rack 26 and pinion 28 are free to be operated manually to set the rock frame 23 into the position desired.

What I claim is:—

1. In a variable speed gearing, a plurality of intermittent grip devices, means for oscillating the same, means for controlling said intermittent grip devices comprising a toothed arm projecting from each intermittent grip device, a worm engaging said arm, a plurality of sprockets, a chain connecting said sprockets, a plurality of shafts extending slidably through the respective sprockets and turning therewith, and universal joints connecting the worms with the respective shafts.

2. In a variable speed gearing, an intermittent grip device, means including a rock frame for oscillating the same, a rack pivoted to the rock frame, a pinion engaging said rack, a shaft supporting the pinion, a worm gear on the shaft, a worm engaging the worm gear, a friction wheel for rotating the worm, a pair of friction disks, either of which is movable into engagement with the friction wheel for operating the latter and the worm in either direction to move said rack up or down and thereby adjust the rock frame, and means for shifting said disks.

3. In a variable speed gearing, an intermittent grip device, means including a rock frame for oscillating the same, a rack pivoted to the rock frame, a pinion engaging said rack, a shaft supporting the pinion, a worm gear on the shaft, a worm engaging the worm gear, a friction wheel for rotating the worm, a pair of friction disks, either of which is movable into engagement with the friction wheel for operating the latter and the worm in either direction to move said rack up or down and thereby adjust the rock frame, and means for shifting said disks and at the same time locking the rack tightly against the pinion.

4. In a variable speed gearing, an intermittent grip device, means including a rock frame for oscillating the same, a rack pivoted to the rock frame, a pinion engaging said rack, a shaft supporting the pinion, a worm gear on the shaft, a worm engaging the worm gear, a friction wheel for rotating the worm, a pair of friction disks, either of which is movable into engagement with the friction wheel for operating the latter and the worm in either direction to move said rack up or down and thereby adjust the rock frame, means for shifting said disks, an eccentrically journaled bearing in which said worm is journaled, and means for turning said bearing to move said worm out of engagement with said worm gear.

In testimony whereof, I have hereunto set my hand at Los Angeles, California, this 14th day of June, 1910.

HUGH WILLIAM FELLOWS.

In presence of—
G. T. HACKLEY,
FRANK L. A. GRAHAM.

Copies of this patent may be obtained for five cents each, by addressing the "Commissioner of Patents, Washington, D. C."